Nov. 2, 1926.

P. PASCHEN 1,605,061

INDUCTION SUPPLY METER

Filed May 18, 1922    2 Sheets-Sheet 1

WITNESSES:
Carl J. Loesch
F. H. Miller

INVENTOR
Paul Paschen
BY Wesley G. Carr
ATTORNEY

Nov. 2, 1926.
P. PASCHEN
1,605,061
INDUCTION SUPPLY METER
Filed May 18, 1922      2 Sheets-Sheet 2
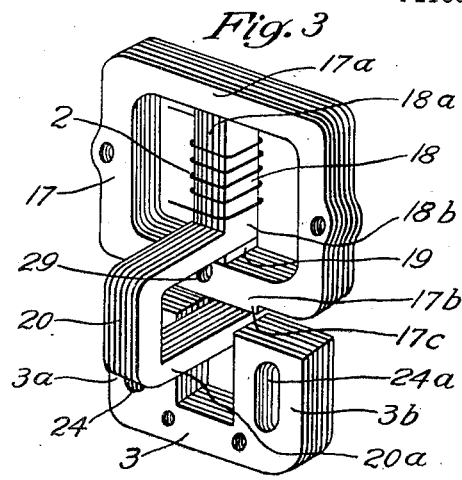
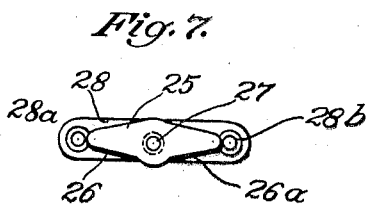
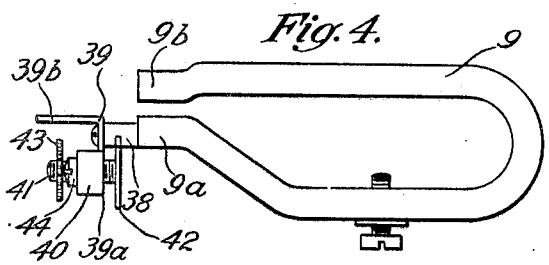
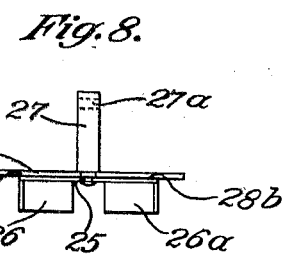
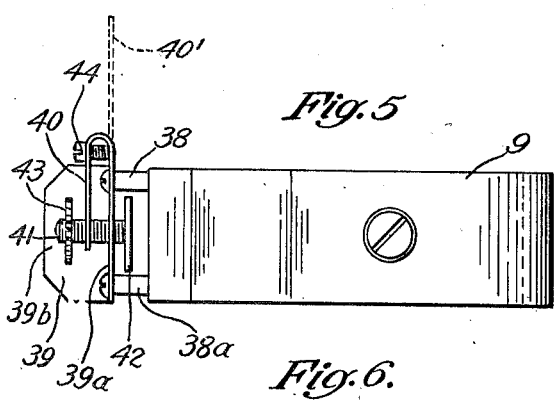
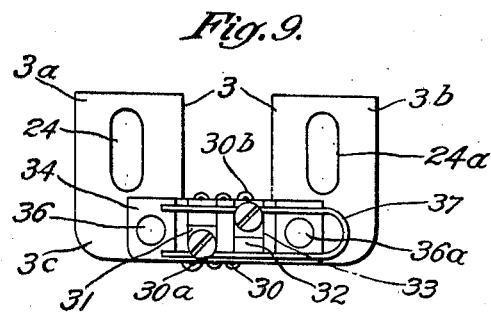
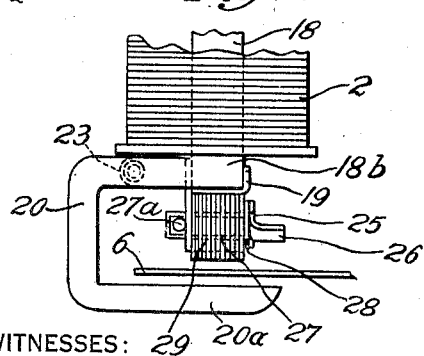
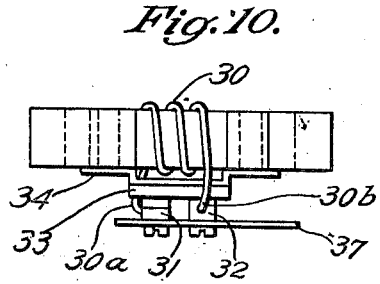
WITNESSES:
INVENTOR
Paul Paschen
BY
Wesley G. Carr
ATTORNEY Patented Nov. 2, 1926.

1,605,061

UNITED STATES PATENT OFFICE.

PAUL PASCHEN, OF NUREMBERG, GERMANY, ASSIGNOR, BY MESNE ASSIGNMENTS, TO WESTINGHOUSE ELECTRIC & MANUFACTURING COMPANY, A CORPORATION OF PENNSYLVANIA.

INDUCTION SUPPLY METER.

Application filed May 18, 1922, Serial No. 562,011, and in Germany March 11, 1922.

The subject matter of the present invention comprises an improved meter of the induction type for electric circuits. The improvement principally relates to the shunt magnet and to means for controlling the starting torque and for controlling the influence of the brake magnet and lastly to the adjustment of the phase difference between the driving magnetic fluxes of the main magnet and the shunt magnet.

The novel shunt magnet is particularly characterized through its form compared with that of the heretofore commonly used forms of shunt magnets for meters of the induction type. In the prior forms of these meters the core of the shunt magnet usually has the form of the letter E, whereby the shunt coil is mounted on the middle shank of the three shanks forming this letter. The spaces between the free ends of the three shanks which face the rotating armature disk of the meter are filled with iron, but not entirely so, air gaps or spaces filled with non-magnetic material being left at these points.

By virtue of these spaces or gaps quite frequently an unsymmetrical magnetic flux is produced which thus permeates the armature disk. This is likely to occur particularly in case the magnet is dismounted for the purpose of relacing burned out coils. The defects are then produced in the remounting of the parts which cannot always be done with sufficient exactness to replace the elements exactly in the same position relatively to each other in which they were placed when the meter was originally assembled and in which the meter was originally tested and adjusted. Such unsymmetry of the magnetic flux has the effect of causing the meter to run without load, that is to say, without current being used by the consumer. This occurs particularly in case the voltage of the current which excites the shunt coil rises beyond its normal value. Such unintentional "no load" operation of the meters has heretofore been found to be a great detriment of this type of current meters. According to the present invention, the shunt magnet is constructed so that the gaps referred to hereinbefore are avoided and thus the detrimental effect produced by these gaps is prevented.

The novel form of my shunt magnet and also the other novel feature of the meter, referred to hereinbefore, are illustrated in the accompanying drawings in which:

Figure 3 is a perspective view of all the electromagnet cores of the meter illustrated in their physical relation to each other;

Figure 4 is a side elevation, and Figure 5 is a bottom view of the braking magnet 9, the front end view of the magnet being shown in Figure 1;

Figure 2:
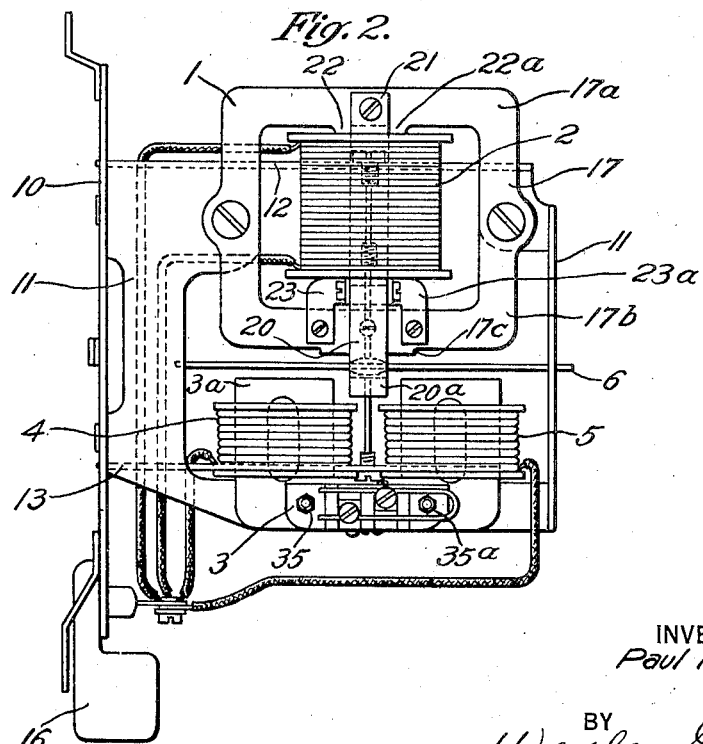
Figure 2 is a side view of the meter, the brake magnet being omitted.

Figure 6 is a side elevation of a portion of the shunt magnet in larger scale, showing the arrangement for controlling the starting torque, the portion 17$^c$ of the annular core (Figures 2 and 3) being shown in Figure 6 in transverse vertical section on the line 6—6 in Figure 2;

Figure 7 is a front view of the controlling device for the shunt starting torque seen from the right hand side in Figure 6;

Figure 8 is a plan view of the device shown in Figure 7;

Figure 9 is an elevation; and

Figure 10 is a plan view of the main magnet core, showing the phase adjusting device correspondingly in side elevation and plan view.

Figure 1:
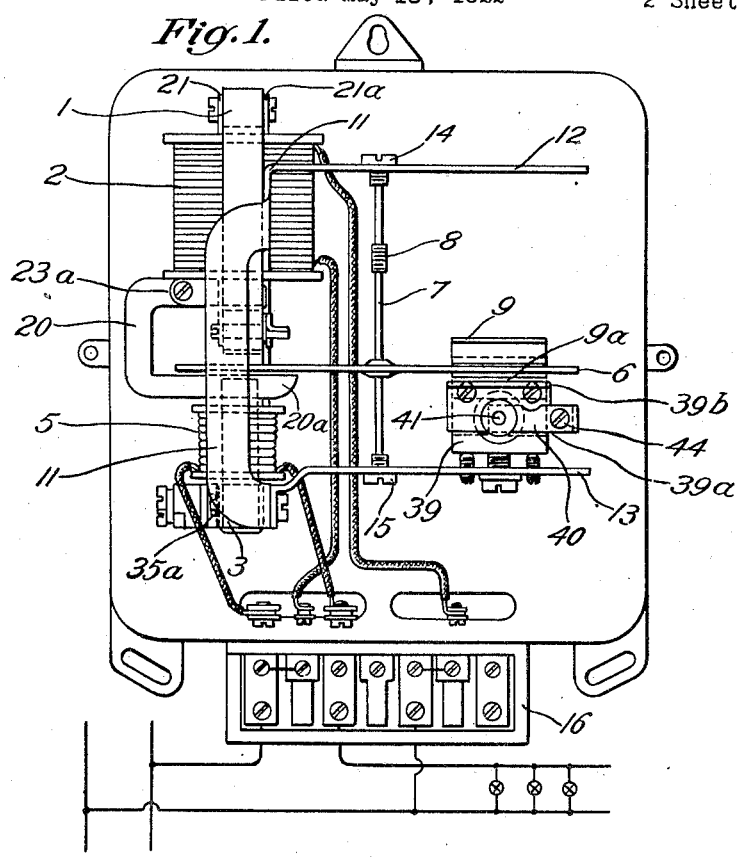
Figure 1 is a front view of a meter embodying the novel features of my invention, the cover of the housing being removed and the mechanical counting device of the meter being omitted.

The main elements of the meter, as will appear clearly from Figures 1 and 2, are the shunt magnet 1, carrying the shunt coil 2; the horseshoe-shaped main magnet 3 carrying the two series connected exciter coils 4, 5; the rotatable armature disk 6, mounted on the vertical spindle 7, the spindle being provided with worm 8 for operating the counting device (not shown); and lastly the brake magnet 9.

These main portions of the meter are mounted on a frame structure constructed substantially according to the disclosure in the U. S. Patent No. 1,222,042 to Singer. This structure consists of the base plate 10 to which is attached a substantially vertical sheet metal frame 11, which carries the shunt magnet 1 and the main magnet 3. This vertical frame has two horizontally extending portions 12 and 13, which are also attached to the base plate 10. These horizontal portions carry the step bearings 14 and 15 of the disk spindle 7 and the lower horizontal portion 14 also carries the brake magnet 9, whereas the upper portion 12 is of sufficient size to also accommodate the mechanical counting mechanism (not shown here as it forms no part of the present invention).

The base plate 10 further carries at its lower portion the terminal plate 16 at which the different coils and electric connections of the meter terminate and at which the meter is connected with the consumer's line as shown in Figure 1.

The iron core of the shunt magnet 1 consists of two portions, the annular core 17 (see Figures 2 and 3) and the coil shank 18. The coil shank 18 is placed substantially diametrically into the opening of the ring core 17 (see Figure 3), so that it contacts magnetically intimately at its upper end $18^a$ with the upper portion $17^a$ of the ring core, whereas its lower end $18^b$ is separated from the lower portion $17^b$ of the ring core by a layer 19 of non-magnetic material. The lower portion $18^b$ of the coil shank has a laterally extending yoke 20 which surrounds the lower portion $17^b$ of the ring core 17 and is of such shape and size that its free end $20^a$ leaves an air gap between itself and a pole shoe $17^c$ provided at the lower portion $17^b$ of the annular core. In this air gap the rotary disk armature 6 is disposed as may be seen from Figures 1, 2 and 6. The shunt coil shank 18 is held in place relatively to the ring core 17 by means of two metal plates 21, $21^a$, fixed to the upper portion $17^a$ of the ring core, the lateral movement of the shank end $18^a$ being prevented by two ridges 22 and $22^a$ (Figure 2) between which the shank end is disposed. The lower portion of shank 18 is attached to the portion $17^b$ of the annular core by means of angles 23, $23^a$ attached to these two elements as will be seen clearly from Figure 2. The planes of lamination of the annular core 17 and the shunt coil shank 18 with its hook 20, stand at right angles to each other.

Owing to this construction of the iron core, the magnetic flux produced by shunt coil 2 is distributed as follows: One portion of this flux passes through the non-magnetic layer 19 from above into the lower portion $17^b$ of the annular core, where it is divided to the left and to the right, returning through the annular core to the upper portion $18^a$ of coil shank 18. Thus this flux does not pass through armature disk 6. It is a stray flux. The other portion of the flux, the driving flux, passes through yoke 20 and emanates from the free end $20^a$ thereof, passes thence through armature disk 6 from below, thence returning from below into pole shoe $17^c$ of the annular core, where it again divides into two branches and joins the stray flux, returning with the latter to the upper portion $18^a$ of the shunt magnet shank 18. It will thus be observed that the portion $17^b$ of the ring core which faces armature disk 6 does not contain a gap which is likely to produce a disturbing unsymmetry of the driving shunt field flux.

The iron core of the main magnet 3 is characterized by the feature that slots 24, $24^a$ are provided in its shanks $3^a$, $3^b$ (see Figures 3 and 9), which slots extend substantially from the yoke of the core to near the pole surfaces of the shanks. The purpose of these slots is to reduce the cross-sectional area of the path which the magnetic flux traverses. The main magnet is disposed relatively to the shunt magnet such that the free end $20^a$ of the shunt magnet yoke passes between the shanks $3^a$, $3^b$ of the main magnet as will be observed from Figures 2 and 3.

The device for adjusting the starting torque is shown in Figures 6 to 8 and is of the following construction. A sheet iron plate 25 is provided which has two wings 26, $26^a$ standing at right angles to the surface of the plate, the planes of the two wings being inclined towards each other as may be seen from Figure 7. Iron plate 25 is riveted to an axle 27 with a plate of any suitable friction material 28 interposed in such manner that when plate 28 is held stationary, axle 27 and with it iron plate 25 may be angularly shifted against plate 28 with sufficient friction to ordinarily hold the two elements 25 and 28 stationary relatively to each other. This friction plate 28 is provided with screw holes $28^a$, $28^b$ and is attached to the side of the lower portion $17^b$ of the ring core 17 as will be clearly seen from Figures 1 and 6. When so mounted axle 27 passes through a hole 29 (see Figures 3 and 6) in the ring core portion and extends a suitable distance beyond the opposite side of the core where it is provided with a hole $27^a$. In order to adjust the starting torque it is only necessary to put a pin through hole $27^a$ by means of which the axle 27 may then be slightly turned in one or the other direction against the friction between plates 25 and 28.

It should be noted that the adjusting device is attached to portion $17^b$ of the annular core such that the center line of axle 27 is located in line with a plane through spindle 7 and at right angles to the plane in which annular core 17 is located. This would constitute a plane at right angles to the plane in which Figure 2 appears. In other words, the adjusting device should be located such that its two wings 26, $26^a$ are symmetrically located on either side of the plane through spindle 7 and at right angles to the annular core 17 in Figure 2. In this figure it will be noted that the location of axle 27 is thus indicated. If now axle 27 is adjusted in one direction or in another by means of a pin, as aforementioned, either wing 26 or 26ᵃ will be closer to armature disk 6 than the other wing and thus a slight unsymmetry of the driving shunt flux may be produced which causes the shunt magnet to exert a slight torque in one or the other direction upon armature disk 6 sufficient to adjust the starting torque to the desired degree, without current flowing through the main coils 4, 5.

The arrangement for adjusting the phase relation between the driving flux of the shunt magnet and the main magnet is disposed on the yoke of the main magnet. It consists of a secondary coil closed by an adjustable resistance and is illustrated in Figures 9 and 10. A number of turns 30 of insulated wire are wound upon yoke 3ᶜ of the main magnet core 3. The ends of these windings 30ᵃ and 30ᵇ are soldered to binding posts 31, 32 which in turn are mounted upon a piece of insulating material 33. This insulating material is suitably attached to a piece of sheet metal 34 which has a double, reverse offset, so that it clears, like a bridge, the windings 30, as will be noted from Figure 10. The sheet metal bridge is attached to the main magnet core by means of screws 35, 35ᵃ (see Figure 2), by which the main magnet is attached to the vertical frame 11. The circuit through windings 30 is closed by means of a wire bail 37 which is held by the screws of binding posts 31, 32. In order to vary the resistance of bail 37, it is only necessary to loosen the screws of binding posts 31, 32 and to shift the bail either to the left or to the right until the desired resistance value is obtained when the screws are tightened up and the bail is fixed in position. This construction is clearly shown in Figure 9.

The device for controlling the value of the braking torque exerted upon armature disk by means of the brake magnet 9 is illustrated in Figures 1, 4 and 5. It is constructed as follows:

To one of the poles (the lower pole 9ᵃ in this particular instance) non-magnetic metal studs 38 and 38ᵃ are attached, which carry an iron angle 39 mounted on the studs in such manner that the surface of one of its shanks 39ᵃ faces the end of pole 9ᵃ, whereas the surface of its other shank 39ᵇ faces the plane of the air gap between poles 9ᵃ, 9ᵇ in which the armature 6 rotates. The shank of the sheet iron angle which is attached to studs 38 is provided with a wing 40 turned back on itself as is shown in Figure 5 (where the wing is shown straightened out in dotted position 40'). Both wing 40 and shank 39ᵃ are provided with holes in alinement with each other and which are suitably threaded to receive an iron adjusting screw 41. This screw has a knurled head 43 fixed to it and carries at its inner end, facing pole 9ᵃ, an iron disk 42. In order to secure screw 41 in position after it has been adjusted by means of knurled head 43, a screw 44 is provided which is threaded into shank 39ᵃ and presses upon wing 40 when tightened so that sufficient friction is produced between the free end of wing 40 and shank 39ᵃ and screw 41 to hold the latter in adjusted position.

Now in order to vary the braking field of brake magnet 9, screw 41 is turned in one or the other direction so that disk 42 is either brought nearer or is further away from pole 9ᵃ. In the former case, more, and in the latter case, fewer magnetic lines of force will be drawn from pole 9ᵃ towards shank 39ᵇ of the sheet iron angle, which constitutes in reality a pole extension of pole 9ᵃ. In this manner, the magnet flux will be distributed more or less over the extension of pole 9ᵃ and thus the braking power of the magnet can be regulated.

I claim:—

1. In an electric meter of the induction type, the combination with a rotary disk armature, of a shunt electromagnet comprising a ring core, a shank placed substantially diametrically into said ring core and adapted to carry the shunt coil of the meter, one end of said shank being disposed opposite one side of the ring core in spaced relation thereto, a yoke integral with the last-mentioned shank end and surrounding the last-mentioned portion of the ring core and forming, with its free end as one pole, an air gap, with said ring core portion as the other pole, said disk armature rotating in said air gap and between said poles.

2. In an electric meter of the induction type in combination a rotary disk armature and a shunt electromagnet comprising a ring core, a shank placed substantially diametrically into said ring core and adapted to carry the shunt coil of the meter, a layer of non-magnetic material interposed between one end of said shank and one side of the ring core, a yoke integral with the last-mentioned shank end and surrounding the last-mentioned portion of the ring core and forming, with its free end as one pole, an air gap with said ring core portion as the other pole, said disk armature rotating in said air gap and between said poles, and a starting torque control device, comprising an iron element rockingly disposed at the center of one side of the ring core pole and having a wing at each end facing the disk armature, said wings alternately approaching and receding from the armature when said element is rocked into the desired position.

3. In an electric meter of the induction type in combination a rotary disc armature and a shunt electromagnet comprising a ring core, a shank placed substantially diametrically into said ring core and adapted to carry the shunt coil of the meter, a layer of non-magnetic material interposed between one end of said shank and one side of the ring core, a yoke integral with the last-mentioned shank end and surrounding the last-mentioned portion of the ring core and forming, with its free end as one pole, an air gap with said ring core portion as the other pole, said disc armature rotating in said air gap and between said poles, a brake magnet disposed to surround with its poles a portion of said armature disk and means for controlling the brake power of said magnet comprising non-magnetic studs fixed to one of the brake poles, an iron body carried by said studs and having a surface facing said armature disc, an iron element adjustably disposed in said iron body to bring it into closer or more remote proximity of said brake pole and means for securing said element in adjusted position.

In testimony whereof I affix my signature.

PAUL PASCHEN.